April 3, 1934. A. VERAN 1,953,281

HORSESHOE

Filed April 20, 1932

Inventor:
Antoine Véran
per Fred F. Harlow
Attorney

Patented Apr. 3, 1934

1,953,281

UNITED STATES PATENT OFFICE 1,953,281

HORSESHOE

Antoine Veran, Avignon, Vaucluse, France

Application April 20, 1932, Serial No. 606,423
In France May 5, 1931

3 Claims. (Cl. 168—13)

The present invention relates to improvements in horseshoes provided with rubber patten pieces, and has for its object particularly improvements in the method of fixing these patten pieces in apertures provided in the shoe.

The characteristic of the invention resides in the fact that these slots or apertures are tapered to a point at their extremities only, the lateral walls being perpendicular and parallel to each other. By this fact it is extremely easy to introduce into the said slots the patten pieces of corresponding form by bending them slightly.

Another feature of the invention consists in the employment of metallic stampings buried in the mass of rubber and permitting the patten pieces to be fixed definitely when placed within the slot by means of nails. There is thus obtained a rapid positioning of the patten pieces which are thus maintained in place either by the shoe or by nails passing through stampings and entering into the horn of the hoof.

The attached drawing represents by way of example one construction of the invention, in which:—

Figure 1:
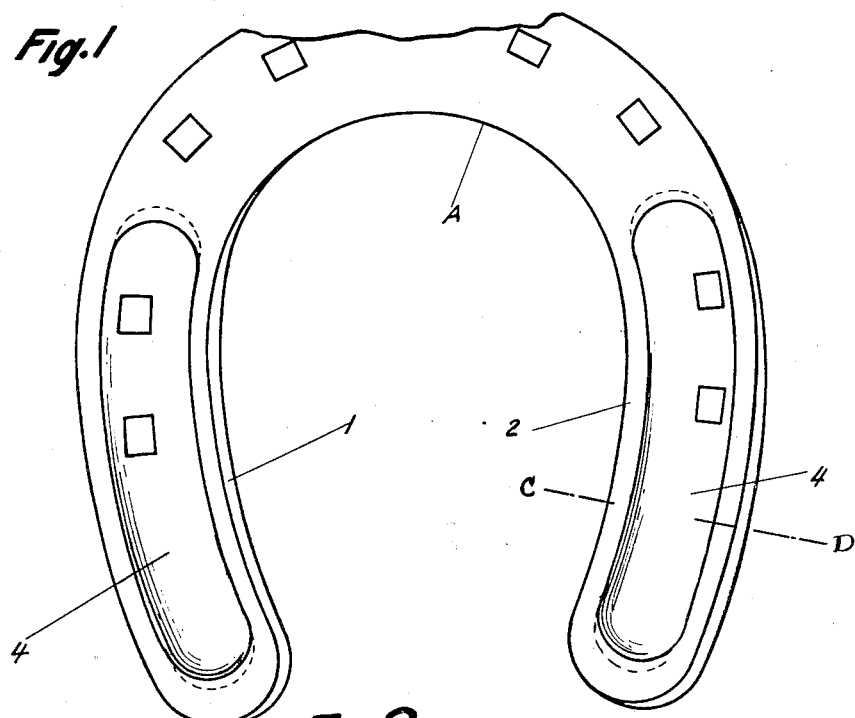
Figure 2:
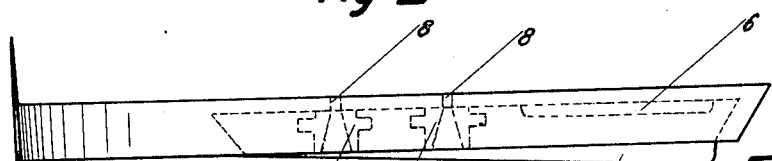
Figure 3:
Figure 5:
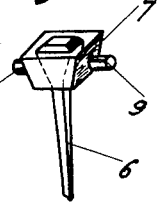
Figure 4:
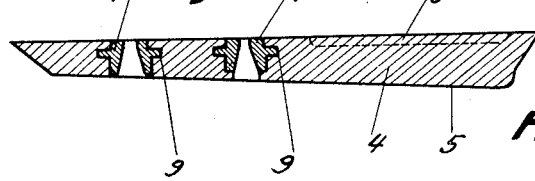
Figure 6:
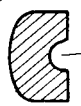
Figure 7:
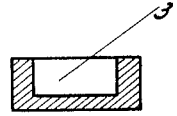

Fig. 1 is a view in plan of the horseshoe seen from below, provided with the patten pieces, Fig. 2 is a side view of the shoe showing in dotted lines one of the pattens provided with the metallic stampings, Fig. 3 is a plan view of the rubber patten, Fig. 4 is a transverse section through the metallic stampings of the patten, Fig. 5 is a perspective view of the stamping showing the position of the nail, Fig. 6 is a section on the line A—B of Fig. 3, and Fig. 7 is a longitudinal section on line C—D of Fig. 1, the patten being removed.

In the branches 1 and 2 of the horseshoe, which is of the usual form, there are produced slightly curved slots 3, the walls of which are perpendicular at the sides but at the extremities are undercut and tapered to a point.

Within these slots there are introduced after having adjusted the shoe to the shape of the foot, the rubber patten pieces 4 of the same shape as the slots, that is to say that the edges of these patten pieces are perpendicular while the extremities are tapered to a point. It is therefore easy to introduce them into the slots in the shoe.

The lower face 5 of the patten tapers to a point, in other words its thickness progressively decreases towards the front part of the shoe and is at this extremity substantially level with the rest of the shoe.

These rubber patten pieces have at the rear a slot 6 permitting the patten to be depressed slightly within its support. Each patten comprises one, two or more stampings 7 of metal and its length may be proportional to the number of stampings incorporated therein. These metal stampings are placed in the mass of rubber either during the manufacture of the pattens or are fitted into apertures produced during the moulding. These metallic stampings 7 may have the form of a truncated parallelepiped, the two faces of which embody small projections 9 for assuring the positioning in the mass of rubber. These small projections 9 may be replaced by two lateral wings formed integrally with the stampings.

The position of these stampings 7 corresponds to the perforations 8 produced in the bottom of the slots and permits the passage of the nails 6 (Fig. 5). These nails therefore fix at the same time the pattens in the slots and the shoe to the foot of the animal.

The efficacy of this shoe against slipping is due to the iron being replaced by rubber for a great part of the surface in contact with the ground, the rubber adhering better to smooth surfaces than the iron.

What I claim and desire to secure by Letters Patent of the United States of America is:—

1. A horseshoe provided with slots in the under surface of the two branches, said slots having parallel side walls and undercut end walls tapering inwardly, rubber patten pieces of corresponding shape located in said slots, metal stampings encased within said rubber pattens, and adapted to have nails passed through said stampings and through apertures in the base of the slots and serving to secure the patten pieces within said slots and the horseshoe to the foot of the animal.

2. A horseshoe provided with curved slots in the two branches thereof, rubber patten pieces lodged within said apertures, said patten pieces tapering so as to project for a substantial distance below the shoe at the rear end of the branch and at its other end to be substantially level with the surface of the shoe, said slots each having parallel side walls and undercut curved end walls to accommodate the patten piece which is correspondingly shaped, metal stampings embedded within said patten pieces, and adapted to have nails passed through said stampings and through corresponding apertures in the slot into the hoof of the animal.

3. A horseshoe as claimed in claim 2, wherein the stampings have the form of a truncated parallelepiped and are provided with laterally projecting portions serving to prevent removal thereof from the body of the rubber.

A. VERAN.